United States Patent
Han et al.

(10) Patent No.: US 10,749,381 B2
(45) Date of Patent: Aug. 18, 2020

(54) WIRELESS POWER TRANSMISSION DEVICE AND METHOD OF CONTROLLING THE SAME

(71) Applicant: WITS Co., Ltd., Yongin-si, Gyeonggi-do (KR)

(72) Inventors: Dong Woo Han, Suwon-si (KR); Byoung Woo Ryu, Suwon-si (KR); Hyo Young Kim, Suwon-si (KR); Se Joo Kim, Suwon-si (KR); Young Seung Roh, Suwon-si (KR)

(73) Assignee: WITS Co., Ltd., Gyeonggi-do (KR)

(*) Notice: Subject to any disclaimer, the term of this patent is extended or adjusted under 35 U.S.C. 154(b) by 400 days.

(21) Appl. No.: 15/801,871

(22) Filed: Nov. 2, 2017

(65) Prior Publication Data

US 2018/0294675 A1    Oct. 11, 2018

(30) Foreign Application Priority Data

Apr. 7, 2017   (KR) .................... 10-2017-0045489

(51) Int. Cl.
   *H02J 50/12*   (2016.01)
   *H02M 7/48*   (2007.01)
   *H02M 1/00*   (2006.01)
   *H02J 7/02*   (2016.01)

(52) U.S. Cl.
   CPC .............. *H02J 50/12* (2016.02); *H02M 7/48* (2013.01); *H02J 7/022* (2013.01); *H02J 7/025* (2013.01); *H02M 2001/0019* (2013.01); *H02M 2007/4818* (2013.01)

(58) Field of Classification Search
   CPC ............ H02J 50/12; H02J 7/022; H02J 7/025; H02M 7/48; H02M 2001/0019; H02M 2007/4818
   USPC ........................................... 307/104
   See application file for complete search history.

(56) References Cited

U.S. PATENT DOCUMENTS

| 10,141,749 B2 * | 11/2018 | Choudhary | ........... H03J 1/0091 |
| 10,447,088 B2 * | 10/2019 | Olyunin | .................. H02J 50/40 |
| 10,523,062 B2 * | 12/2019 | Bae | ......................... H02J 50/80 |
| 2011/0234011 A1 | 9/2011 | Yi et al. | |
| 2012/0161532 A1 | 6/2012 | Ogawa et al. | |

(Continued)

FOREIGN PATENT DOCUMENTS

| JP | 2013-226041 A | 10/2013 |
| JP | 2013-243882 A | 12/2013 |
| KR | 10-2011-0108598 A | 10/2011 |

*Primary Examiner* — Rexford N Barnie
*Assistant Examiner* — Brian K Baxter
(74) *Attorney, Agent, or Firm* — Harness, Dickey & Pierce, P.L.C.

(57) ABSTRACT

A wireless power transmission device including a resonant circuit magnetically coupled to a wireless power reception device and being configured to wirelessly transmit power, an alternating current (AC) generator including switches and being configured to receive a direct current (DC) voltage and to generate an AC current, according to a switching operation of the switches, to be supplied to the resonant circuit, and a variable capacitor connected to an output terminal of the AC generator and having a first capacitance, when a load state of the wireless power reception device is provided as a full load state and a second capacitance lower than the first capacitance, when the load state is provided as a light load state.

16 Claims, 6 Drawing Sheets

(56) References Cited

U.S. PATENT DOCUMENTS

| | | | |
|---|---|---|---|
| 2014/0111023 A1* | 4/2014 | Kagami | G06F 30/15 |
| | | | 307/104 |
| 2015/0146460 A1* | 5/2015 | Lin | H02M 1/4208 |
| | | | 363/84 |
| 2017/0110913 A1* | 4/2017 | Shin | H02J 50/80 |
| 2017/0117751 A1* | 4/2017 | Karnstedt | H02J 50/12 |
| 2018/0212464 A1* | 7/2018 | Liu | H02J 50/12 |
| 2018/0375380 A1* | 12/2018 | Liu | H02M 1/088 |
| 2019/0305595 A1* | 10/2019 | Mantha | H02J 7/025 |
| 2020/0006981 A1* | 1/2020 | Yamamoto | H02J 13/0003 |
| 2020/0014215 A1* | 1/2020 | Fujimura | H02J 4/00 |

\* cited by examiner

WIRELESS POWER TRANSMISSION DEVICE AND METHOD OF CONTROLLING THE SAME

CROSS-REFERENCE TO RELATED APPLICATION

This application claims the benefit under 35 USC § 119(a) of Korean Patent Application No. 10-2017-0045489, filed on Apr. 7, 2017 in the Korean Intellectual Property Office, the entire disclosure of which is incorporated herein by reference for all purposes.

BACKGROUND

1. Field

The following description relates to a wireless power transmission device and to a method of controlling the same.

2. Description of Related Art

With the development of wireless technology, various wireless functions, such as transmission of data, and transmission of power, have been enabled. Wireless power transmission technology allowing an electronic device to be charged with power, even when the electronic device is not in contact with a wireless power transmission device, has recently been developed. The transmission efficiency of wireless power is a significant factor in wireless power transmission technology.

In wireless power transmission technology, resonant circuits of transmitting devices may be set to secure optimal transmission efficiency in a full load state. Thus, when a load of wireless power transmission devices is charged to have a specific level of electric charge or more to escape from a full load state, transmission efficiency is reduced.

SUMMARY

This Summary is provided to introduce a selection of concepts that are further described below in the Detailed Description in simplified form. This Summary is not intended to identify key features or essential features of the claimed subject matter, nor is it intended to be used as an aid in determining the scope of the claimed subject matter.

In one general aspect, there is provided a wireless power transmission device, including a resonant circuit magnetically coupled to a wireless power reception device and being configured to wirelessly transmit power, an alternating current (AC) generator including switches and being configured to receive a direct current (DC) voltage and to generate an AC current, according to a switching operation of the switches, to be supplied to the resonant circuit, and a variable capacitor connected to an output terminal of the AC generator and being configured to variably set capacitance, in response to a load state of the wireless power reception device, wherein the load state includes a full load state or a light load state.

The full load state may include a load state demanding a rated output of the wireless power transmission device, the light load state may include a load state demanding an output lower than the rated output of the wireless power transmission device, the variable capacitor has a first capacitance, in response to the load state being the full load state, and the variable capacitor has a second capacitance lower than the first capacitance, in response to the load state being the light load state.

The variable capacitor may include first capacitors connected between drains of the switches and a ground terminal in parallel, respectively, and second capacitors may be connected to the first capacitors in parallel, respectively, and having variable capacitance.

In the full load state, a capacitance of the variable capacitor may be determined based on the first capacitors and the second capacitors.

In the light load state, a capacitance of the variable capacitor may be determined based on the first capacitors.

The wireless power transmission device may include a controller configured to adjust the capacitance of the variable capacitor.

The controller may be configured to set the load state as the full load state to adjust the capacitance of the variable capacitor, in response to a demand load of the wireless power transmission device being higher than a threshold.

The controller may be configured to set the load state as the light load state to adjust the capacitance of the variable capacitor, in response to the demand load of the wireless power transmission device being lower than or equal to the threshold.

The controller may be configured to adjust the AC generator to maintain an output current of the AC generator to be uniform in the full load state, and to reduce the output current of the AC generator in the light load state.

The controller may be configured to receive a load state of the wireless power reception device using any one or any combination of a short-distance wireless communication protocol and a modulated magnetic field.

In another general aspect, there is provided a method of controlling a wireless power transmission device, including determining a demand load of a wireless power reception device, selecting a load state of the wireless power reception device based on the demand load, setting a capacitance of a variable capacitor as a first capacitance, in response to the load state of the wireless power reception device being set to a full load state, and setting the capacitance of the variable capacitor as a second capacitance, lower than the first capacitance, in response to the load state of the wireless power reception device being set to a light load state.

The full load state may include a load state demanding a rated output of the wireless power transmission device, and the light load state may include a load state demanding an output lower than the rated output of the wireless power transmission device.

The variable capacitor may include first capacitors connected between drains switches included in an AC generator and a ground terminal in parallel, respectively, and second capacitors connected to the first capacitors in parallel, respectively and having variable capacitance.

The setting of the capacitance of the variable capacitor as the first capacitance may include setting the capacitance of the variable capacitor using the first capacitors and the second capacitors.

The setting of the capacitance of the variable capacitor as the second capacitance may include setting the capacitance of the variable capacitor using the first capacitors.

The method may include setting the load state as the full load state, in response to a demand load of the wireless power transmission device being higher than a threshold.

The method may include setting the load state as the light load state, in response to the demand load of the wireless power transmission device is lower than or equal to the threshold.

Other features and aspects will be apparent from the following detailed description, the drawings, and the claims.

Figure 1:
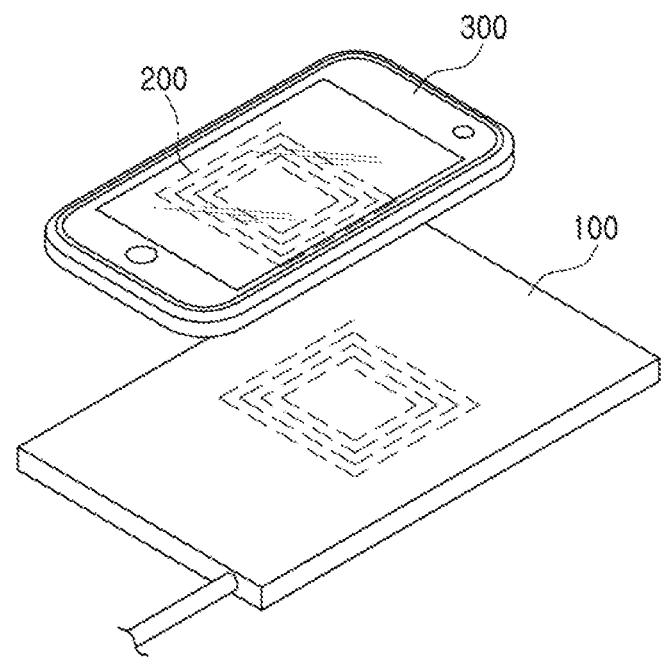
FIG. 1 is a diagram illustrating an example of a wireless power transmission device.

Throughout the drawings and the detailed description, the same reference numerals refer to the same elements. The drawings may not be to scale, and the relative sizes, proportions, and depictions of elements in the drawings may be exaggerated for the purposes of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known in the art maybe omitted for increased clarity and conciseness.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

Although terms such as "first," "second," and "third" maybe used herein to describe various members, components, regions, layers, and/or sections, these members, components, regions, layers, and/or sections are not to be limited by these terms. Rather, these terms are only used to distinguish one member, component, region, layer, or section from another member, component, region, layer, or section. Thus, a first member, component, region, layer, or section referred to in an example below could also be referred to as a second member, component, region, layer, or section without departing from the teachings of the example.

Spatially relative terms, such as "above," "upper," "below," and "lower," may be used herein for ease of description to describe one element's relationship to another element as shown in the figures. Such spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements. Thus, the term "above" can encompass both the above and below orientations depending on a particular direction of the figures. The device may be otherwise oriented (rotated 90 degrees or at other orientations), and the spatially relative terms used herein are to be interpreted accordingly.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a diagram illustrating an example of a wireless power transmission device.

With reference to FIG. 1, a wireless power transmission device 100 is disposed adjacent to a wireless power reception device 200 such that the devices are magnetically coupled (e.g., by magnetic resonance or magnetic induction) to wirelessly transmitting power.

In an example, the wireless power reception device 200 supplies the power, which it has received, to an electronic device 300. In an example, the wireless power reception device 200 is provided as a separate device, or is incorporated within the electronic device 300 as one of its component, or is connected to the electronic device 300.

To transmit power at optimal efficiency in response to a load state of the wireless power reception device 200, the wireless power transmission device 100 controls its capacitance.

When a wireless power reception device demands a maximum load, a resonant circuit of a wireless power transmission device is designed to be optimized in a full load state. Thus, when a charge in the full load state is not demanded, i.e., power lower than the full load state is transmitted, charging efficiency of the resonant circuit of the wireless power transmission device may be decreased.

In an example, the wireless power transmission device 100 controls the capacitance of the wireless power transmission device 100 according to the load state of the wireless power reception device 200, thereby providing optimized transmission efficiency, even when the load state of the wireless power reception device 200 is changed.

Figure 2:
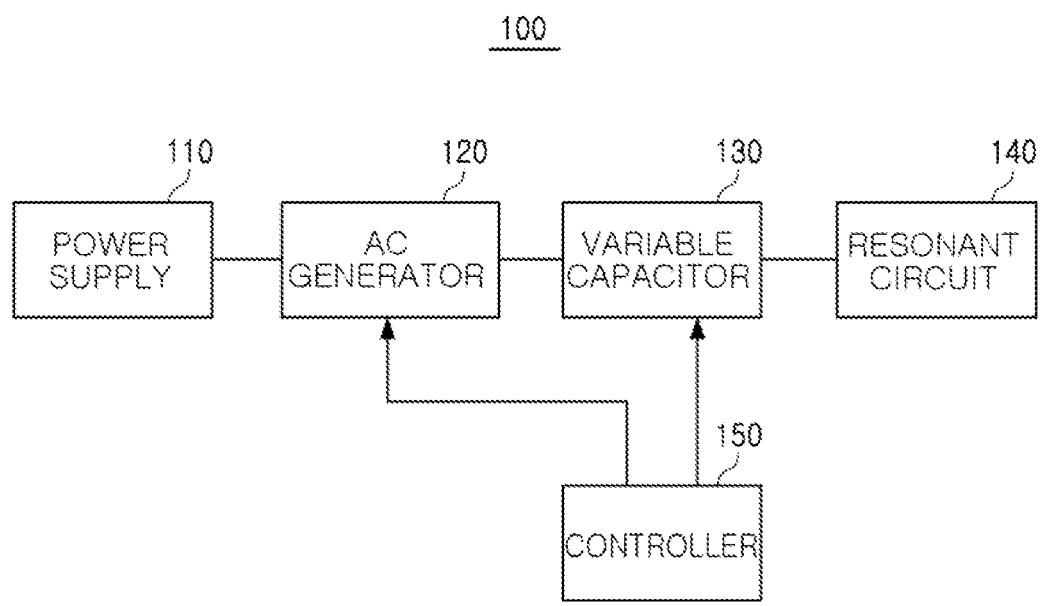
FIG. 2 is a diagram illustrating an example of a wireless power transmission device.

FIG. 2 is a diagram illustrating an example of a wireless power transmission device.

With reference to FIG. 2, a wireless power transmission device 100 includes an alternating current (AC) generator 120, a variable capacitor 130, a resonant circuit 140, and a controller 150. In an example, the wireless power transmission device 100 further includes a power supply 110, and the power supply 110 supplies direct current (DC) power. In an example, the power supply 110 is provided as a power adapter receiving commercial AC power to generate a DC voltage.

In an example, the power supply 110 adjusts a level of output DC power. For example, the power supply 110 adjusts the level of DC power output according to control of the controller 150.

In an example, the power supply 110 is incorporated in the wireless power transmission device 100. In another example, the power supply 110 is implemented as a separate device connected to the wireless power transmission device 100.

The AC generator 120 receives a DC voltage to supply an AC current to the resonant circuit 140. In an example, the AC generator 120 includes at least one power amplifying element. The AC generator 120 may control switching of the power amplifying element, thereby adjusting a level of a voltage or a current supplied to the resonant circuit 140.

In an example, the AC generator 120 includes a plurality of switching elements, and the plurality of switching elements are connected to opposing ends of the resonant circuit 140, respectively. The AC generator 120 generates a potential difference between the opposing ends of the resonant circuit 140 to allow a coil current to flow in the resonant circuit 140, thereby allowing the resonant circuit 140 to be magnetically coupled to a reception resonator (not illustrated) of an external wireless power reception device.

In an example, the variable capacitor 130 is connected to an output terminal of the AC generator 120 and the resonant circuit 140 and variably sets capacitance. In an example, the variable capacitor 130 variably sets capacitance in response to a load state of the wireless power reception device 200.

According to an example, the wireless power transmission device 100 may include a filter (not shown), and the filter may be connected to an input terminal of the resonant circuit 140. In an example, the variable capacitor 130 may be connected between the output terminal of the AC generator 120 and the input terminal of the filter.

When the load state of the wireless power reception device 200 is changed, a capacitance of the variable capacitor 130 may be adjusted to improving power transmitting efficiency, even in the case in which the load state is changed.

In an example, the load state includes a full load state and a light load state.

The full load state is a state in which a wireless power reception device demands rated output of a wireless power transmission device and is a state in which the wireless power transmission device supplies maximum power.

The light load state is a state in which the wireless power reception device demands output lower than the rated output of the wireless power transmission device.

When the variable capacitor 130 is in the full load state, the variable capacitor 130 may have a first capacitance. When the variable capacitor 130 is in the light load state, the variable capacitor 130 may have a second capacitance, lower than the first capacitance. In the light load state, the variable capacitor 130 may be set to have capacitance lower than that in the full load state.

For example, under ideal conditions, a peak voltage applied to a switch of the AC generator 120 is several times (e.g., 3.56 times) higher than a DC voltage output by the power supply 110, the peak voltage may be expressed using Formula 1 below.

$$V_{DS\_max} \approx \frac{1.134 I_s}{\omega C_{sh}} \approx 1.134\left(\frac{\pi}{4} + \frac{1}{\pi} - 0.785\right)^{-1} V_{DD} \approx 3.56 V_{DD} \quad \text{[Formula 1]}$$

Here, VDS_max is the peak voltage of the switch of the AC generator 120, W is 2 *pi*frequency, Csh is a capacitance value of a switch-parallel capacitor, and VDD is a DC voltage output by a power supply.

As described in Formula 1, the peak voltage VDS_max of the switch of the AC generator 120 is inversely proportion to a capacitance value Csh of a parallel capacitor of the variable capacitor 130. Thus, when the peak voltage value of the switch is lower than a specific multiple of an input DC voltage, for example, lower than 3.56 times under ideal conditions, a capacitance value of the parallel capacitor of the variable capacitor 130 may be lowered to reduce overall capacitance, thereby compensating for the peak voltage of the switch of the AC generator 120, i.e., increasing the peak voltage.

In an example, in the full load state, the peak voltage of the switch satisfies a specific multiple of the input DC voltage, for example, 3.56 times under ideal conditions. However, in when the full load state is converted into the light load state, the peak voltage of the switch may not satisfy a specific multiple of the input DC voltage, for example, 3.56 times under ideal conditions. In an example, the peak voltage of the switch may be lower than a specific multiple of the input DC voltage, for example, 3.56 times under ideal conditions. Thus, the capacitance value of the parallel capacitor of the variable capacitor 130 may be lowered to reduce overall capacitance, thereby increasing the peak voltage VDS_max of the switch. Thus, the peak voltage of the switch may be close to the specific multiple of the input DC voltage.

In an example, the controller 150 controls an operation of the variable capacitor 130 to adjust the capacitance of the variable capacitor 130.

In an example, the variable capacitor 130 includes a switch connected to a capacitor and may have different levels of capacitance according to a switching operation of the switch. The controller 150 may control an operation of the switch included in the variable capacitor 130, thereby adjusting the capacitance of the variable capacitor 130.

The controller 150 may differently adjust a level of capacitance of the variable capacitor 130 depending on the load state, that is, the light load state or the full load state.

In an example, the controller 150 receives load information from the wireless power reception device. The load state of the wireless power reception device may be determined using a short-distance wireless communications line or obtaining information from a modulated magnetic field. The short-distance wireless communications line may be based on a short-distance wireless communications protocol.

In another example, the controller 150 detects a current or a voltage in the wireless power transmission device 100 to determine the load state. For example, when an output voltage of the power supply 110 is decreased, the controller 150 may be determined to be in the light load state. In another example, when an input current of a resonant circuit is at a specific level or higher, the controller 150 may be determined to be in the full load state. In an example, the controller 150 may control a variable capacitor, while wireless power transmissions may be controlled using a separate control means.

In an example, a criterion of the full load state and the light load state may be set by the controller 150. For example, not only a state in which maximum output is demanded, but also a state in which output at a set level or higher is demanded, may be set as the full load state. The full load state and the light load state may be differently set according to a design environment of the wireless power transmission device.

In an example, when a demand load of the wireless power transmission device 100 is higher than a specific level of output, for example, 70% of rated output, the controller 150 may set the load state as the full load state, thereby adjusting capacitance of the variable capacitor. In addition, in a case in which the demand load of the wireless power transmission device is at a specific level of output or lower, for example, 70% of rated output, the controller 150 may set the load state as the light load state, thereby adjusting capacitance of the variable capacitor.

A load of 70% is just an example, other values for dividing the full load state and the light load state may be used without departing from the spirit and scope of the illustrative examples described The controller 150 may control the AC generator 120. The controller 150 may differently use control methods in the full load state and in the light load state.

For example, in the full load state, the controller 150 may use a control method to allow an output current of the AC generator 120 to be uniform.

In another example, in the light load state, the controller 150 may use a control method to allow the output current of the AC generator 120 to be uniformly reduced.

Figure 4:
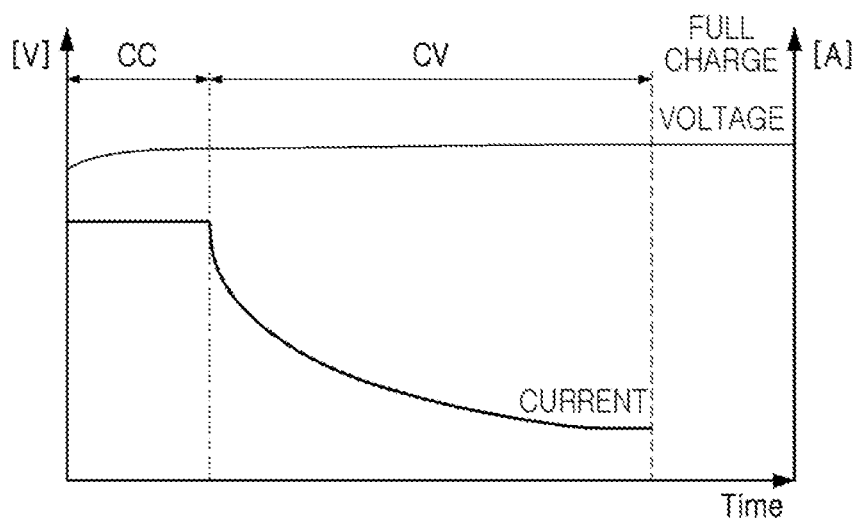
FIG. 4 is a diagram illustrating an example of a current and a voltage of a battery of an output terminal of a wireless power reception device.

FIG. 4 is a graph illustrating an example of a current and a voltage of a battery of an output terminal of a wireless power reception device.

In an example illustrated in FIG. 4, a controller 150 may allow an output current of an AC generator 120 to be uniform, in a full load state. Thus, it can be confirmed that a voltage of a battery is gradually increased.

In the meantime, it can be confirmed that, in a light load state, the controller 150 may adjust the output current of the AC generator 120, i.e., allow the output current to be reduced in an illustrated example, thereby maintaining the voltage of the battery to be uniform.

In the full load state, a current is maintained to be uniform, in order to stably supply power. On the other hand, in the light load state, a level of a current is adjusted to be uniformly reduced, thereby adjusting the voltage of the battery.

In an example, the controller 150 includes at least one processing unit. According to an example, the controller 150 may further include a memory. In an example, the processing unit includes one or more of a central processing unit (CPU), a graphics processing unit (GPU), a microprocessor, an application specific integrated circuit (ASIC), a field programmable gate array (FPGA), and may include a plurality of cores. The memory may be provided as a volatile memory (e.g., a random access memory (RAM), or the like), a non-volatile memory (e.g., a read only memory (ROM), a flash memory, or the like), or combinations thereof. Additional details of the controller and the memory is provided below.

Figure 3:
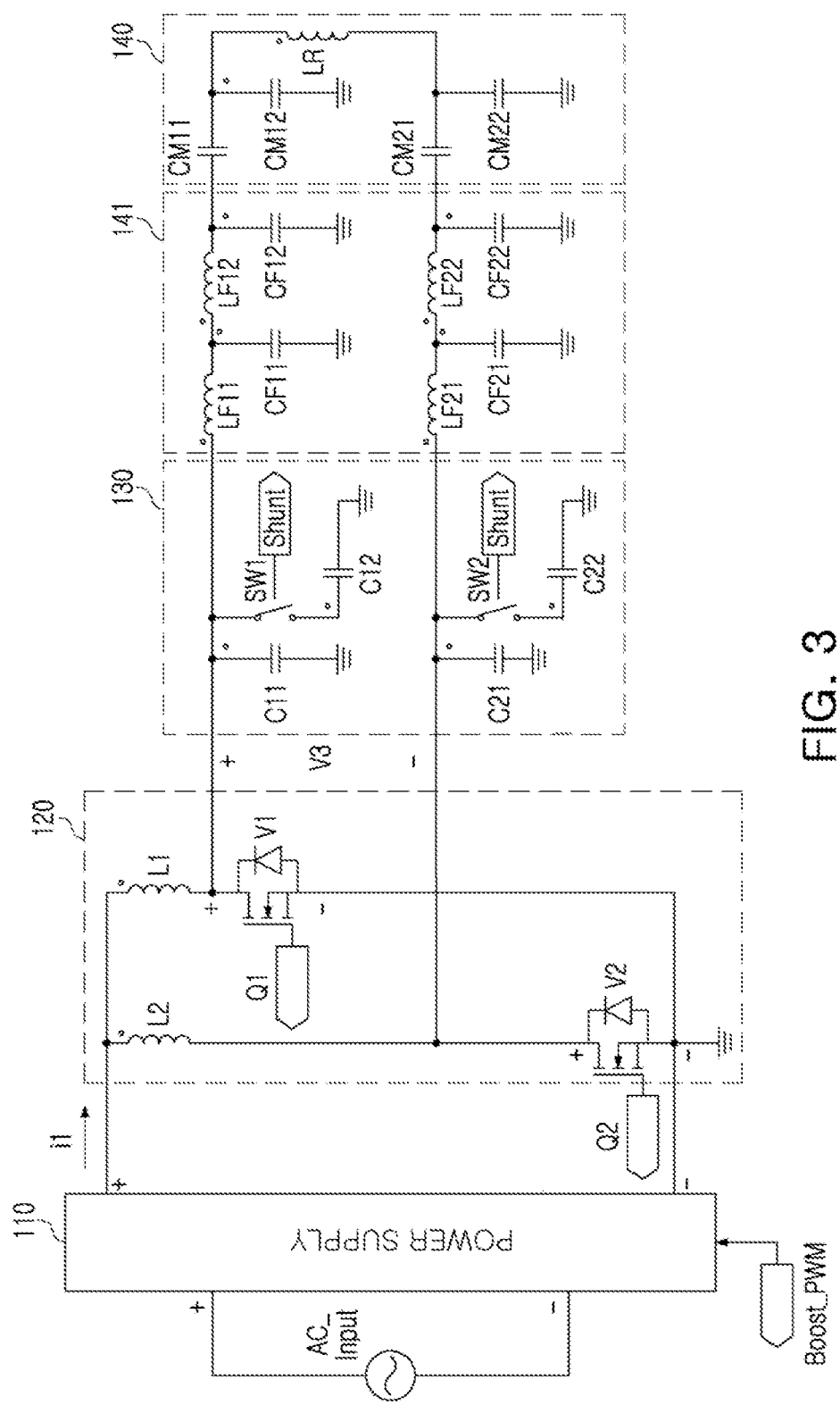
FIG. 3 is a circuit diagram illustrating an example of a wireless power transmission device.

FIG. 3 is a diagram illustrating an example of a wireless power transmission device.

With reference to FIG. 3, in an example, the wireless power transmission device includes a power supply 110, an AC generator 120, a variable capacitor 130, and a resonant circuit 140. A controller (not illustrated) may control an operation of the power supply 110, the AC generator 120, or the variable capacitor 130.

In an example, the power supply 110 generates DC power from AC power.

In an example, the AC generator 120 includes a first amplifier switch Q1 and a second amplifier switch Q2, connected to anode and cathode input terminals and a first inductor L1 and a second inductor L2, connected thereto in series, respectively.

In an example, one end of the first inductor L1 and one end of the second inductor L2 are connected to an anode input terminal. The other end of the first inductor L1 is connected to one end of the first amplifier switch Q1, while the other end of the second inductor L2 is connected to one end of the second amplifier switch Q2. The other end of the first amplifier switch Q1 and the other end of the second amplifier switch Q2 is grounded.

According to a switching operation of the first amplifier switch Q1 and the second amplifier switch Q2, charges stored in the first inductor L1 and the second inductor L2 are output as a voltage between an anode input terminal and a cathode input terminal.

In an example, the variable capacitor 130 is connected to anode and cathode output terminals of the AC generator 120 and may variably set capacitance.

In an example, the variable capacitor 130 includes first capacitors C11 and C21 and second capacitors C12, SW1, C22, and SW2. The first capacitors C11 and C21 may include capacitance connected between drains of the first amplifier switch Q1 and a ground terminal in parallel and connected between drains of the second amplifier switch Q2 and a ground terminal in parallel, to be fixed. The second capacitors C12, SW1, C22, and SW2 may be connected to the plurality of first capacitors in parallel, respectively and may have variable capacitance.

A first switch SW1 and a second switch SW2 may be turned on in a full load state and may be turned off in a light load state.

Capacitance of the variable capacitor 130 in the full load state may be determined by capacitance of first capacitors C11 and C21 and second capacitors C12 and C22. In the light load state, the capacitance of the variable capacitor 130 may only be determined by the first capacitors C11 and C21.

According to an example, the wireless power transmission device further includes a filter 141. Alternatively, the resonant circuit 140 may further include predetermined matching circuits CM11 to CM22.

Figure 5:
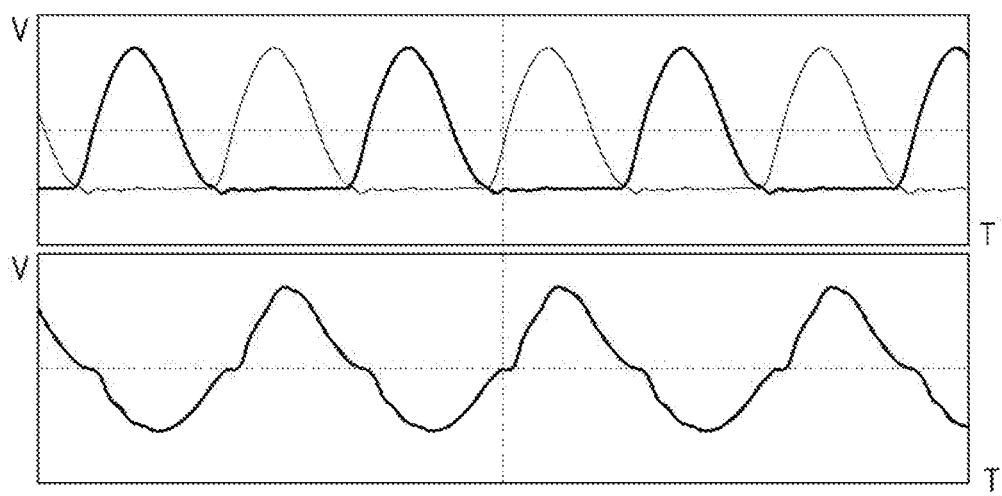
FIGS. 5 to 7 are diagrams illustrating examples of control elements of a wireless power transmission device according to a load state of a wireless power reception device.
Figure 6:
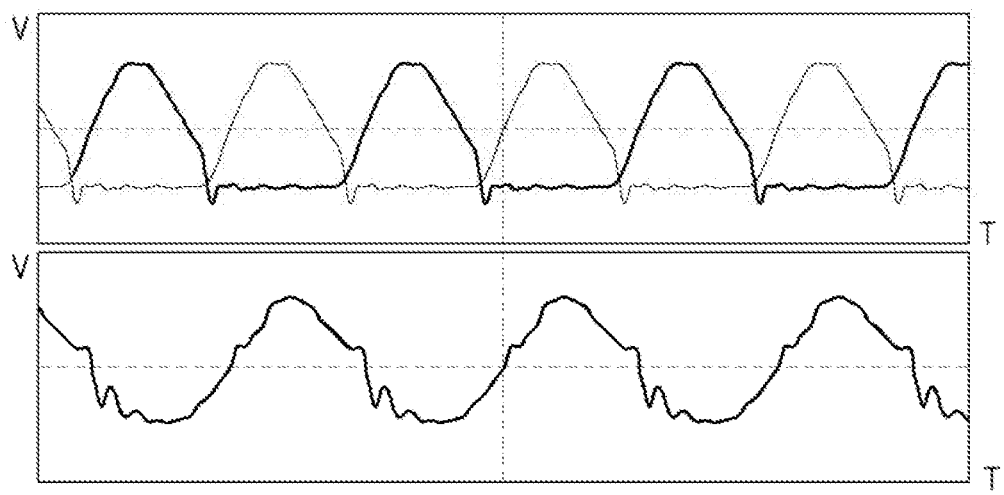
Figure 7:
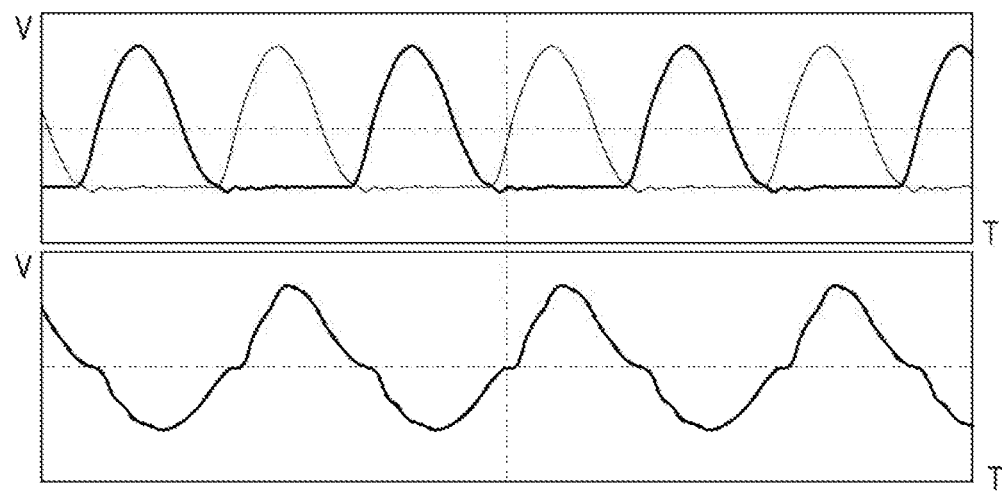

FIGS. 5 to 7 are diagrams illustrating examples of control elements of a wireless power transmission device according to a load state of a wireless power reception device.

In FIGS. 5 to 7, an upper graph illustrates a drain/source voltage V1 of a first amplifier switch and a drain/source voltage V2 of a second amplifier switch. A lower graph illustrates a voltage V3 of anode and cathode output terminals of an AC generator 120.

FIG. 5 illustrates an example of an output waveform in a full load state, for example, when a load is 100%. Since the wireless power transmission device is set to be optimally operated when the load is 100%, a drain/source voltage of an amplifier switch is provided as a sine wave, while the voltage V3 of anode and cathode output terminals of the AC generator 120 also has a waveform similar to the sine wave. Thus, the wireless power transmission device is operated under conditions similar to zero voltage switching (ZVS) conditions.

FIG. 6 illustrates an example of an output waveform of a comparative example to which a variable capacitor is not applied in a light load state, for example, when the load is 50%. Different from an example illustrated in FIG. 5, a drain/source voltage waveform of each amplifier switch is distorted, which refers to an unsatisfied ZVS condition of the wireless power transmission device. Thus, the voltage V3 of anode and cathode output terminals of the AC generator 120 is also different from the sine wave.

FIG. 7 illustrates an example of a waveform to which the variable capacitor is applied, according to an example, in the light load state, for example, when the load is 50%.

As illustrated in FIG. 7, the drain/source voltage of the amplifier switch is provided as the sine wave, while the voltage V3 of anode and cathode output terminals of the AC generator 120 also has the waveform similar to the sine wave. Thus, the wireless power transmission device is operated under conditions similar to the ZVS conditions.

As such, in an example, even in the case in which a load state is changed, the wireless power transmission device is operated under conditions similar to the ZVS conditions, thereby having relatively high transmission efficiency.

Table 1 displays an input and output voltage, a current, and efficiency by load of an example and a comparative example.

TABLE 1

|  | 100% Load (Example) | 50% Load (Example) | 50% Load (Comparative Example) |
| --- | --- | --- | --- |
| Input Voltage | 9 [V] | 9 [V] | 9 [V] |
| Input Current | 1.692 [A] | 0.989 [A] | 1.037 [A] |
| Output Voltage | 9.485 [V] | 9.506 [V] | 9.505 [V] |
| Output Current | 1 [A] | 0.5 [A] | 0.5 [A] |
| Efficiency | 62.29 [%] | 53.40 [%] | 50.92 [%] |

With reference to Table 1, as compared with an example where the variable capacitor is not applied, in the case of an example of the present disclosure, efficiency is higher by about 3% under the same conditions as a 50% load.

Figure 8:
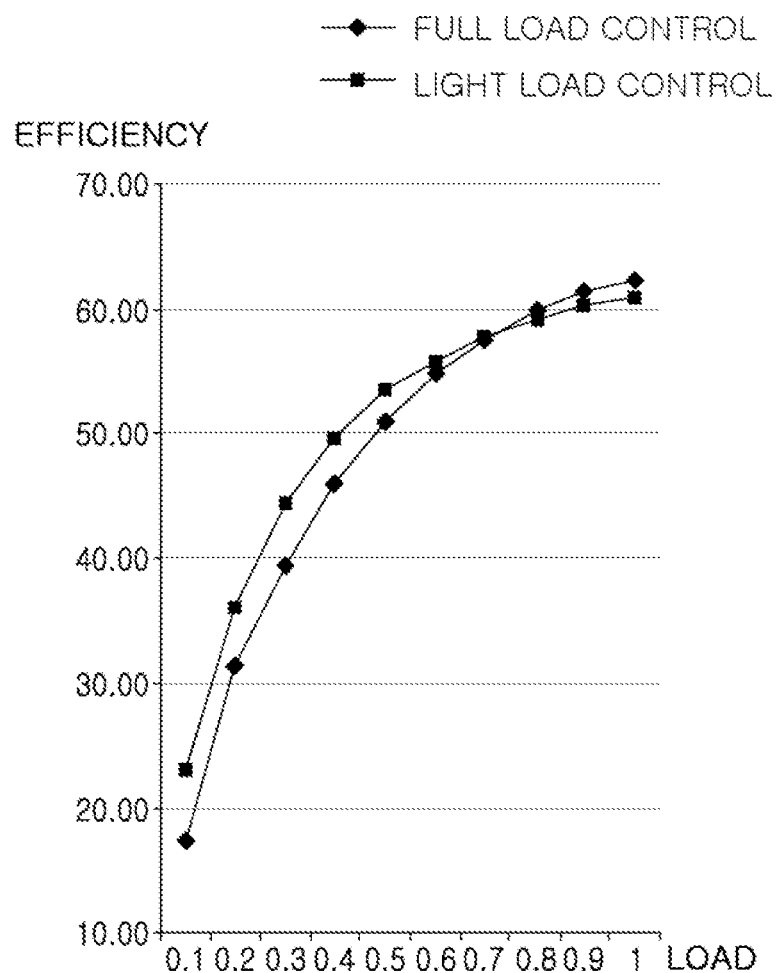
FIG. 8 is a diagram illustrating an example of transmission efficiency.

FIG. 8 is a diagram illustrating an example of transmission efficiency of an example and illustrates efficiency measured by changing a load by 0.1 [A].

In the conditions in which a load is 100%, efficiency of a full load control in which capacitance is not variably set is relatively high. However, it is shown that, as a load is decreased based on a 70% load, efficiency of a light load control in which capacitance is variably set is higher than that of the full load control.

In the conditions in which the load is higher than 70%, the full load control is used, while, in the conditions in which the load is 70% or lower, the light load control is used, thereby satisfying optimal output conditions.

Figure 9:
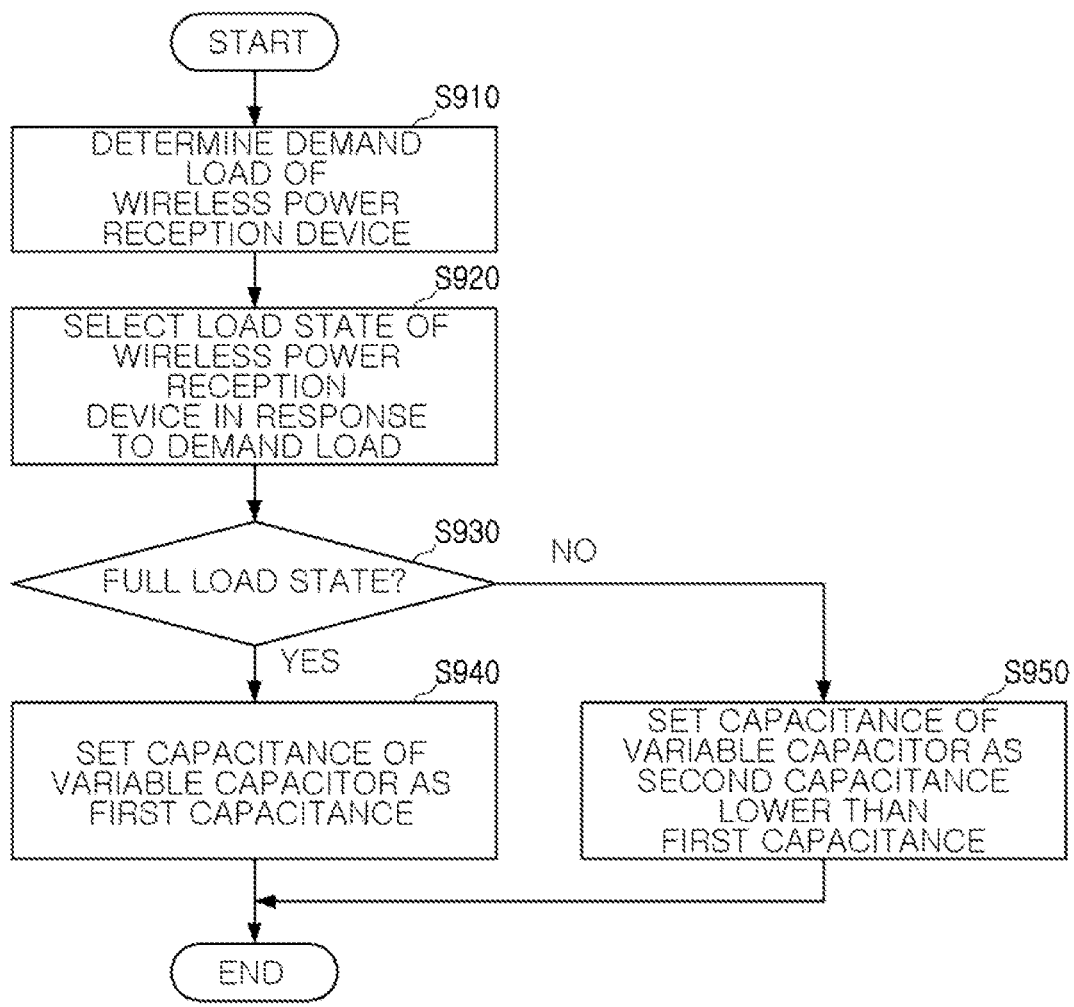
FIG. 9 is a diagram illustrating an example of a method of controlling a wireless power transmission device.

FIG. 9 is a diagram illustrating an example of a method of controlling a wireless power transmission device. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 is also applicable to FIG. 9, and are incorporated herein by reference. Thus, the above description may not be repeated here.

With reference to FIG. 9, in S910, the wireless power transmission device includes a variable capacitor and determines a demand load of a wireless power reception device.

In S920, the wireless power transmission device selects a load state of the wireless power reception device, in response to the demand load.

In S930, when a full load state is selected as a load state of the wireless power reception device (YES in S930), the wireless power transmission device sets a capacitance of a variable capacitor as a first capacitance in S940.

In S930, when a light load state is selected as the load state of the wireless power reception device (NO in S930), the wireless power transmission device may set the capacitance of the variable capacitor as a second capacitance, lower than the first capacitance in S950.

In an example, the load state of the wireless power reception device may include the full load state demanding rated output of the wireless power transmission device and the light load state demanding output lower than the rated output of the wireless power transmission device.

In an example, the variable capacitor may include a plurality of first capacitors connected to drains of a plurality of switches included in an AC generator in parallel, respectively and may include a plurality of second capacitors connected to the plurality of first capacitors in parallel and having variable capacitance.

In an example, the wireless power transmission device may use an entirety of the plurality of first capacitors and the plurality of second capacitors, thereby setting the capacitance of the variable capacitor as the first capacitance.

In another example, the wireless power transmission device may not use the plurality of second capacitors, but only use the plurality of first capacitors, thereby setting the capacitance of the variable capacitor as the second capacitance.

In an example, in a case in which the demand load of the wireless power transmission device is higher than 70%, the wireless power transmission device may set the load state as the full load state. In another example, in a case in which the demand load of the wireless power transmission device is 70% or lower, the wireless power transmission device may set the load state as the light load state.

As set forth above, according to examples, a wireless power transmission device may have relatively high transmission efficiency, even in the case in which a change in a charging state of a wireless power reception device occurs.

Examples provide a wireless power transmission device having relatively high transmission efficiency, even in the case in which a change in a charging state of a wireless power reception device occurs.

The controller 150 and other apparatuses, units, modules, devices, and other components illustrated in FIGS. 1-3 that perform the operations described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods, illustrated in FIG. 9, that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A wireless power transmission device, comprising:
a resonant circuit magnetically coupled to a wireless power reception device and being configured to wirelessly transmit power;
an alternating current (AC) generator comprising switches and being configured to receive a direct current (DC) voltage and to generate an AC current, according to a switching operation of the switches, to be supplied to the resonant circuit; and a variable capacitor connected to an output terminal of the AC generator and being configured to variably set capacitance, in response to a load state of the wireless power reception device,
wherein the load state comprises a full load state or a light load state, and
wherein the variable capacitor comprises,
first capacitors connected between drains of the switches and a ground terminal in parallel, respectively, and
second capacitors connected to the first capacitors in parallel, respectively, and having variable capacitance.

2. The wireless power transmission device of claim 1, wherein:
the full load state comprises a load state demanding a rated output of the wireless power transmission device;
the light load state comprises a load state demanding an output lower than the rated output of the wireless power transmission device;
the variable capacitor has a first capacitance, in response to the load state being the full load state; and
the variable capacitor has a second capacitance lower than the first capacitance, in response to the load state being the light load state.

3. The wireless power transmission device of claim 1, wherein, in the full load state, a capacitance of the variable capacitor is determined based on the first capacitors and the second capacitors.

4. The wireless power transmission device of claim 1, wherein in the light load state, a capacitance of the variable capacitor is determined based on the first capacitors.

5. The wireless power transmission device of claim 1, further comprising:
a controller configured to adjust the variable capacitance of the variable capacitor.

6. The wireless power transmission device of claim 5, wherein the controller is further configured to set the load state as the full load state to adjust the variable capacitance of the variable capacitor, in response to a demand load of the wireless power transmission device being higher than a threshold.

7. The wireless power transmission device of claim 6, wherein the controller is further configured to set the load state as the light load state to adjust the variable capacitance of the variable capacitor, in response to the demand load of the wireless power transmission device being lower than or equal to the threshold.

8. The wireless power transmission device of claim 5, wherein the controller is further configured to adjust the AC generator to maintain an output current of the AC generator to be uniform in the full load state, and to reduce the output current of the AC generator in the light load state.

9. The wireless power transmission device of claim 5, wherein the controller is further configured to receive the load state of the wireless power reception device using any one or any combination of a short-distance wireless communication protocol and a modulated magnetic field.

10. A method of controlling a wireless power transmission device, comprising: determining a demand load of a wireless power reception device;
selecting a load state of the wireless power reception device based on the demand load;
setting a capacitance of a variable capacitor as a first capacitance, in response to the load state of the wireless power reception device being set to a full load state; and
setting the capacitance of the variable capacitor as a second capacitance, lower than the first capacitance, in response to the load state of the wireless power reception device being set to a light load state,
wherein the variable capacitor comprises,
first capacitors connected between drains switches included in an AC generator and a ground terminal in parallel, respectively, and
second capacitors connected to the first capacitors in parallel, respectively, and having variable capacitance.

11. The method of claim 10, wherein the full load state comprises a load state demanding a rated output of the wireless power transmission device, and the light load state comprises a load state demanding an output lower than the rated output of the wireless power transmission device.

12. The method of claim 10, wherein the setting the capacitance of the variable capacitor as the first capacitance comprises setting the capacitance of the variable capacitor using the first capacitors and the second capacitors.

13. The method of claim 10, wherein the setting the capacitance of the variable capacitor as the second capacitance comprises setting the capacitance of the variable capacitor using the first capacitors.

14. The method of claim 10, further comprising:
setting the load state as the full load state, in response to a demand load of the wireless power transmission device being higher than a threshold.

15. The method of claim 14, further comprising setting the load state as the light load state, in response to the demand load of the wireless power transmission device is lower than or equal to the threshold.

16. A non-transitory computer-readable medium storing instructions that, when executed by a processor, cause the processor to perform the method of claim 10.

* * * * *